United States Patent Office 3,005,807
Patented Oct. 24, 1961

3,005,807
PROCESS FOR CARBOXYLATION OF ISOOLEFIN-DIOLEFIN COPOLYMERS
Henry G. Schutze, Baytown, Tex., and Willard H. Bonner, Jr., Wilmington, Del., assignors, by mesne assignments, to Esso Research and Engineering Company, Elizabeth, N.J., a corporation of Delaware
No Drawing. Filed Nov. 19, 1956, Ser. No. 622,807
4 Claims. (Cl. 260—85.3)

This invention relates to modified tertiary isoolefin-diolefin polymers and to a process for preparing the same. More particularly, this invention relates to modified tertiary isoolefin-diolefin polymers of high bond strength and improved cold flow characteristics and to a process for preparing the same.

Conventionally prepared tertiary isoolefin-diolefin copolymers such as copolymers of about 95 to 99.5 mol percent of isobutylene with about 5 to 0.5 mol percent of isoprene have many desirable physical properties. However, such copolymers are characterized by low bond strength and, as a result, they are bonded to other materials such as natural rubber, synthetic butadiene-styrene copolymer synthetic rubbers, butadiene-acrylonitrile synthetic rubbers, etc. only with great difficulty.

Accordingly, an object of the present invention is the provision of modified tertiary isoolefin-diolefin copolymers of improved bond strength.

Another object is the provision of modified tertiary isoolefin-diolefin copolymers having improved bond strength characteristics and improved cold flow properties.

A further object is the provision of a process for preparing modified tertiary isoolefin-diolefin copolymers.

A still further object of the present invention is the provision of a process for modifying tertiary isoolefin-diolefin polymers whereby there is obtainable a modified copolymer having an improved bonding characteristic and improved cold flow properties.

These and other objects are attained by reacting a copolymer of about 95 to 99.5 mol percent of a tertiary isoolefin and 5 to 0.5 mol percent of a diolefin with an alkali metal alkyl containing 1 to 14 carbon atoms in the alkyl radical in solution in a non-reactive organic solvent to form an alkali metal-containing copolymer, carbonating said copolymer to obtain a modified alkali metal carboxylate containing copolymer and then reacting the alkali metal carboxylate with a strong acid to convert the carboxylate groups to carboxyl groups to thereby form a copolymer having improved bonding properties and improved cold flow characteristics, about 0.2 to 1 mol of alkali metal alkyl being used for each mol of combined diolefin radical in the copolymer.

The copolymers to be modified in accordance with the present invention are copolymers of about 95 to 99.5 mol percent of a tertiary isoolefin such as isobutylene, 2-methyl-1-butene, 2-methyl-2-butene, 2-methyl-1-pentene, 2-methyl-2-pentene, 3-methyl-2-pentene, isoheptatene, etc. with about 5 to 0.5 mol percent of a $C_4$ to $C_7$ conjugated diolefin such as butadiene, isoprene, 1,3-conjugated pentadienes, 1,3-conjugated hexadienes, etc. A preferred copolymer is the so-called "Butyl" rubber copolymer of industry which is a copolymer of about 99 mol percent of isobutylene and about 1 mol percent of isoprene.

Copolymers of the above nature are reacted alone, or in admixture, with about 0.2 to 1 mol per mol of combined diolefin radical of an alkali metal alkyl containing 1 to 14 carbon atoms or a mixture of 2 or more such alkali metal alkyls to form an alkali metal-containing intermediate polymer product. Representative of the alkali metal alkyls that may be used alone or in admixture are lithium, sodium, potassium, etc., aliphatic alkyls such as methyl-, butyl-, amyl-, octyl-, dodecyl-, tetradecyl-, etc., lithium, sodium, potassium, etc.

The alkali metal alkyl should be reacted with the tertiary isoolefin-diolefin copolymer in solution in a non-reactive organic solvent such as a $C_5$ to $C_{10}$ aliphatic hydrocarbon or a mixture of such hydrocarbons.

The reaction is preferably conducted at room temperature and atmospheric pressure, although somewhat higher and lower temperatures and pressures may be used if desired.

As a result of this reaction, a solution of an alkali metal-containing copolymer intermediate product in the organic solvent is obtained, which intermediate is reacted in solution with a suitable carboxylating agent such as solid carbon dioxide whereby there is obtained a tertiary isoolefin-conjugated diolefin copolymer containing alkali metal carboxylate groups.

The organic solvent solution of the alkali metal carboxylate-containing copolymer is then treated with a strong acid such as hydrochloric acid, sulfuric acid, aromatic sulfonic acids, nitric acid, perchlorous acid, phosphoric acid, trichloracetic acid, etc. or a mixture of such acids to convert the alkali metal carboxylate groups to carboxyl groups. A slight excess of acid is preferably employed, the amount of acid preferably being such that not more than about 3 volume percent of acid per volume of solvent are present in the reaction medium.

If desired, the acid may be added together with a suitable washing liquid (e.g., a ketone such as acetone, an ether, etc.).

The carboxylic copolymer prepared in this fashion is characterized by improved bonding characteristics and improved cold flow properties.

The following specific examples are given by way of illustration and are not intended as limitations on the scope of this invention. Where parts are mentioned, they are parts by weight.

Example I

Add about 50 parts of a suspension prepared by suspending about 100 parts of N-amyl sodium in about 1300 parts of heptane to about 1,000 parts of a 4 percent solution of a copolymer of about 99 mol percent of isobutylene with about 1 mol percent of isoprene in pure iso-octane in order to react the N-amyl sodium with the copolymer. The reaction goes to substantial completion within about one-half hour as shown by a change in color of the reaction mixture from an initial blue-black color to a final dark green color. After the reaction has gone to substantial completion, carbonate the polymeric reaction product through the addition of dry, solid, carbon dioxide to the reaction mixture; the carbonation reaction being conducted for a period of at least about 15 minutes. As a result, there is formed an isobutylene-isoprene copolymer containing sodium carboxylate groups. Wash the reaction mixture with equal volumes of acetone containing about 5 volume percent of concentrated hydrochloric acid whereby the polymer is precipitated. Recover the precipitated polymer by filtration, wash the same with water and acetone and dry.

The thus obtained polymeric product, which is a copolymer of isoprene with isobutylene containing carboxyl groups, is self-form retaining and may be used as an interlayer in bonding a layer of unmodified isobutylene-isoprene copolymers to a layer of natural or synthetic rubber.

Example II

Repeat Example I with but one exception, namely, the addition of 150 parts of the N-amyl sodium solution to the initial copolymer solution. The product that is obtained by reacting this additional amount of N-amyl sodium with the isobutylene-isoprene copolymer is not self-form retaining.

*Example III*

Carbonate a 4 percent solution of a copolymer of about 99 mol percent of isobutylene with about 1 mol percent of isoprene in pure iso-octane through the addition of dry, solid carbon dioxide. The resultant modified copolymer product is not self-form retaining.

The properties of the thus-reacted copolymers as compared with the unmodified isobutylene isoprene copolymer are set forth in the following table.

TABLE I

|  | Original | Example I | Example II | Example III |
|---|---|---|---|---|
| Mooney Vis. at 212° F.: | | | | |
| 1½ min | 75 | 69 | 78.0 | 44 |
| 8 min | 73 | 60.5 | 72.5 | 39 |
| Modulus | 1010 | 1030 | 1190 | 1100 |
| Tensile Strength, psi | 2620 | 2070 | 2780 | 2630 |
| Elongation, percent | 680 | 620 | 720 | 720 |
| Color | Dark | White | Dark | Light |
| Intrinsic viscosity (n) | 0.52 | 0.38 | 0.27 | 0.12 |
| Self-Form Retaining After 6 Months | Yes | Yes | No | No |

From the above table it will be seen that the copolymer of Example I was self-form retaining (i.e., substantially free from cold flow characteristics) whereas the other treated samples were not.

Having described our invention, what is claimed is:

1. A process which comprises reacting an isoolefin-conjugated diolefin copolymer of about 95 to 99 mol percent of normally gaseous olefin with about 5 to 1 mol percent of a $C_4$ to $C_8$ conjugated diolefin with about 0.2 to 1 mol of an alkali metal alkyl per mol of combined conjugated diolefin in the polymer in solution in a non-reactive organic solvent to obtain an alkali metal-containing intermediate product, carbonating said intermediate product in said solution with solid dry carbon dioxide to obtain an alkali metal carboxylate-containing copolymer, and acidifying said alkali metal carboxylate-containing copolymer with an excess of an acid to convert said carboxylate groups to carboxyl groups, the alkyl groups of said alkali metal containing 1 to 14 carbon atoms.

2. A process as in claim 1 wherein the alkali metal alkyl is amyl sodium.

3. A process as in claim 1 wherein the copolymer is an isobutylene-isoprene copolymer and wherein the alkali metal alkyl is amyl sodium.

4. A process which comprises reacting a copolymer of about 99 mol percent of isobutylene with 1 mol percent of isoprene with about 0.2 to 1 mol of amyl sodium per mol of combined isoprene in organic solvent solution at atmospheric temperature and pressure, adding dry, solid carbon dioxide to said reaction mixture, next adding an excess of an acid and then recovering from said solvent a substantially self-form retaining, bondable copolymer product containing carboxyl groups.

References Cited in the file of this patent
UNITED STATES PATENTS

| 2,142,980 | Huijser et al. | Jan. 3, 1939 |
| 2,344,213 | Otto | Mar. 14, 1944 |
| 2,356,128 | Thomas et al. | Aug. 22, 1944 |
| 2,669,550 | Brown | Feb. 16, 1954 |
| 2,845,403 | Gunberg | July 29, 1958 |